United States Patent
Li et al.

(10) Patent No.: US 11,265,113 B2
(45) Date of Patent: *Mar. 1, 2022

(54) METHODS AND APPARATUS FOR MULTI-CARRIER COMMUNICATION SYSTEMS WITH AUTOMATIC REPEAT REQUEST (ARQ)

(71) Applicant: GUANGDONG OPPO MOBILE TELECOMMUNICATIONS CORP., LTD., Dongguan (CN)

(72) Inventors: Xiaodong Li, Kirkland, WA (US); Haiming Huang, Bellevue, WA (US); Titus Lo, Bellevue, WA (US); Kemin Li, Bellevue, WA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 77 days.

This patent is subject to a terminal disclaimer.

(21) Appl. No.: 16/849,509

(22) Filed: Apr. 15, 2020

(65) Prior Publication Data

US 2020/0244405 A1 Jul. 30, 2020

Related U.S. Application Data

(63) Continuation of application No. 16/381,747, filed on Apr. 11, 2019, now Pat. No. 10,659,197, which is a continuation of application No. 15/362,536, filed on Nov. 28, 2016, now Pat. No. 10,313,061, which is a continuation of application No. 14/796,907, filed on
(Continued)

(51) Int. Cl.
*H04L 1/18* (2006.01)
*H04L 5/00* (2006.01)
*H04W 72/04* (2009.01)
*H04W 74/00* (2009.01)
(Continued)

(52) U.S. Cl.
CPC .......... *H04L 1/1812* (2013.01); *H04L 1/0026* (2013.01); *H04L 1/1671* (2013.01); *H04L 5/003* (2013.01); *H04L 5/0055* (2013.01); *H04W 72/0406* (2013.01); *H04W 74/002* (2013.01); *H04L 1/0003* (2013.01); *H04L 1/0013* (2013.01); *H04L 1/1816* (2013.01); *H04L 1/1819* (2013.01); *H04L 1/1822* (2013.01); *H04L 1/1845* (2013.01); *H04L 2001/0092* (2013.01)

(58) Field of Classification Search
CPC . H04L 1/1819; H04L 5/0055; H04L 12/1868; H04W 28/04; H04W 28/085
See application file for complete search history.

(56) References Cited

U.S. PATENT DOCUMENTS

| | | |
|---|---|---|
| 5,909,469 A | 6/1999 | Frodigh et al. |
| 6,101,168 A | 8/2000 | Chen et al. |

(Continued)

*Primary Examiner* — Charles C Jiang
*Assistant Examiner* — Ryan C Kavleski
(74) *Attorney, Agent, or Firm* — Finnegan, Henderson, Farabow, Garrett & Dunner, LLP

(57) ABSTRACT

Hybrid ARQ is employed in a multi-carrier communication system for retransmission of erroneous packets by taking advantage of time/frequency/space diversity and by combining ARQ functions at physical layer and MAC layers,
(Continued)

making the multi-carrier system more robust in a high packet-error environment.

19 Claims, 6 Drawing Sheets

Related U.S. Application Data

Jul. 10, 2015, now Pat. No. 9,509,451, which is a continuation of application No. 14/066,597, filed on Oct. 29, 2013, now Pat. No. 9,083,500, which is a continuation of application No. 10/583,239, filed as application No. PCT/US2005/003889 on Feb. 7, 2005, now Pat. No. 8,571,057.

(60) Provisional application No. 60/542,317, filed on Feb. 7, 2004.

(51) Int. Cl.
*H04L 1/00* (2006.01)
*H04L 1/16* (2006.01)

(56) References Cited

U.S. PATENT DOCUMENTS

| | | |
|---|---|---|
| 8,359,506 B2 | 1/2013 | Seok et al. |
| 2001/0056560 A1 | 12/2001 | Khan et al. |
| 2002/0159410 A1 | 10/2002 | Odenwalder et al. |
| 2002/0177447 A1* | 11/2002 | Walton .......... H04B 7/0626 455/452.1 |
| 2003/0003937 A1* | 1/2003 | Ohkubo .......... H04B 7/0608 455/517 |
| 2003/0095532 A1* | 5/2003 | Kim .............. H04L 1/0041 370/342 |
| 2003/0125040 A1 | 7/2003 | Walton et al. |
| 2004/0057400 A1 | 3/2004 | Walsh et al. |
| 2004/0095907 A1 | 5/2004 | Agee et al. |
| 2004/0148634 A1 | 7/2004 | Arsenault et al. |
| 2004/0213184 A1 | 10/2004 | Hu et al. |
| 2004/0264497 A1 | 12/2004 | Wang et al. |
| 2005/0032522 A1 | 2/2005 | Soong et al. |
| 2005/0068908 A1 | 3/2005 | Qian et al. |
| 2005/0111376 A1 | 5/2005 | Raghothaman et al. |
| 2006/0107192 A1 | 5/2006 | Mantha et al. |
| 2008/0304430 A1 | 12/2008 | Zhuyan |

* cited by examiner

METHODS AND APPARATUS FOR MULTI-CARRIER COMMUNICATION SYSTEMS WITH AUTOMATIC REPEAT REQUEST (ARQ)

CROSS-REFERENCE TO RELATED APPLICATION(S)

This application is a continuation of U.S. patent application Ser. No. 16/381,747, filed Apr. 11, 2019, entitled "METHODS AND APPARATUS FOR MULTI-CARRIER COMMUNICATION SYSTEMS WITH AUTOMATIC REPEAT REQUEST (ARQ)," which is a continuation of U.S. patent application Ser. No. 15/362,536 (now U.S. Pat. No. 10,313,061), filed Nov. 28, 2016, entitled "METHODS AND APPARATUS FOR MULTI-CARRIER COMMUNICATION SYSTEMS WITH AUTOMATIC REPEAT REQUEST (ARQ)," which is a continuation of U.S. patent application Ser. No. 14/796,907 (now U.S. Pat. No. 9,509,451), filed Jul. 10, 2015, entitled "METHODS AND APPARATUS FOR MULTI-CARRIER COMMUNICATION SYSTEMS WITH AUTOMATIC REPEAT REQUEST (ARQ)," which is a continuation of U.S. patent application Ser. No. 14/066,597 (now U.S. Pat. No. 9,083,500), filed Oct. 29, 2013, entitled "METHODS AND APPARATUS FOR MULTI-CARRIER COMMUNICATION SYSTEMS WITH AUTOMATIC REPEAT REQUEST (ARQ)," which is a continuation of U.S. patent application Ser. No. 10/583,239 (now U.S. Pat. No. 8,571,057), filed Oct. 16, 2008, entitled "METHODS AND APPARATUS FOR MULTI-CARRIER COMMUNICATION SYSTEMS WITH AUTOMATIC REPEAT REQUEST (ARQ)," which is a 371 of PCT Application No. PCT/US2005/003889, filed Feb. 7, 2005, entitled "METHODS AND APPARATUS FOR MULTI-CARRIER COMMUNICATION SYSTEMS WITH AUTOMATIC REPEAT REQUEST (ARQ)," which claims the benefit of U.S. Provisional Patent Application No. 60/542,317, filed Feb. 7, 2004, entitled "METHODS AND APPARATUS FOR MULTI-CARRIER COMMUNICATION SYSTEMS WITH AUTOMATIC REPEAT REQUEST (ARQ)." All of the foregoing applications are incorporated herein by reference in their entirety. This application also relates to PCT Application No. PCT/US2005/003518 titled "METHODS AND APPARATUS FOR OVERLAYING MULTI-CARRIER AND DIRECT SEQUENCE SPREAD SPECTRUM SIGNALS IN A BROADBAND WIRELESS COMMUNICATION SYSTEM," filed Jan. 27, 2005, which claims the benefit of U.S. Provisional Application No. 60/540,032 filed Jan. 29, 2004 and U.S. Provisional Application No. 60/540,586 filed Jan. 30, 2004.

BACKGROUND

Automatic Repeat Request (ARQ) schemes are often used in packet communication systems to improve transmission reliability. Hybrid ARQ is a method that combines both FEC (forward error correction) and ARQ where previously unsuccessful transmissions are used in FEC decoding instead of being discarded. Hybrid ARQ enhances the effectiveness of FEC decoding and allows FEC blocks to be sent at high error rate operating points (S. B. Wicker, *Error Control Systems for Digital Communication and Storage*, Prentice-Hall, Inc., 1995).

One form of hybrid ARQ is "Chase" combining where the transmitter retransmits the same coded data packet (D. Chase, "*Code Combing: A maximum-likelihood decoding approach for combining an arbitrary number of noisy packets,*" IEEE Trans. on Commun., Vol. 33, pp. 593-607, May, 1985). The decoder at the receiver combines multiple copies of this transmitted packet in a certain manner. Another form is called incremental redundancy, where instead of sending simple repeats of the coded data packet, progressive parity packets are sent in each subsequent transmission of the packet. The decoder then combines packets with incremental information in an appropriate fashion and therefore decodes the packet at a lower code rate.

Hybrid ARQ normally involves the functionality at the physical layer and controls the FEC encoding and FEC decoding functions using an embedded physical layer fast feedback channel for control signaling. At times, the physical layer hybrid ARQ-FEC blocks may be retransmitted for the maximum number of times without success. Therefore, it alone cannot provide error free data delivery but permits operation at a lower signal-to-interference-plus-noise ratio (SINR).

Medium access control (MAC) ARQ is an error control feature which retransmits erroneous MAC packet data units (PDUs) in a flexible fashion to achieve error free data delivery. MAC-ARQ retransmissions may occur long after original transmission and the retransmission may be segmented and piggy backed on other MAC PDUs using the granularity of the defined ARQ block size.

DETAILED DESCRIPTION systems are described herein. In particular, methods and apparatus are devised to carry out retransmission of erroneous packets by taking advantage of time/frequency/space diversity. In addition, a hierarchical ARQ scheme is designed to combine ARQ functionality at physical layer and MAC layers, thereby making the multi-carrier system more robust in a high packet-error environment.

The multi-carrier system mentioned here can be of any format such as OFDM, or Multi-Carrier Code Division Multiple Access (MC-CDMA). The presented methods can also be applied to downlink, uplink, or both, where the duplexing technique is either Time Division Duplexing (TDD) or Frequency Division Duplexing (FDD).

The following description provides specific details for a thorough understanding of the various embodiments and for the enablement of one skilled in the art. However, one skilled in the art will understand that the invention may be practiced without such details. In some instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number in this Detailed Description section also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Multi-Carrier Communication System

The physical media resource (e.g., radio or cable) in a multi-carrier communication system can be divided in both the frequency and time domains. This canonical division provides a high flexibility and fine granularity for resource sharing.

The basic structure of a multi-carrier signal in the frequency domain is made up of subcarriers. Within a particular spectral band or channel, there are a fixed number of subcarriers, which are of three types:

1. Data subcarriers, which carry information data;
2. Pilot subcarriers, whose phases and amplitudes are predetermined and made known to all receivers and which are used for assisting system functions such as estimation of system parameters; and
3. Silent subcarriers, which have no energy and are used for guard bands and DC carrier.

Figure 1:
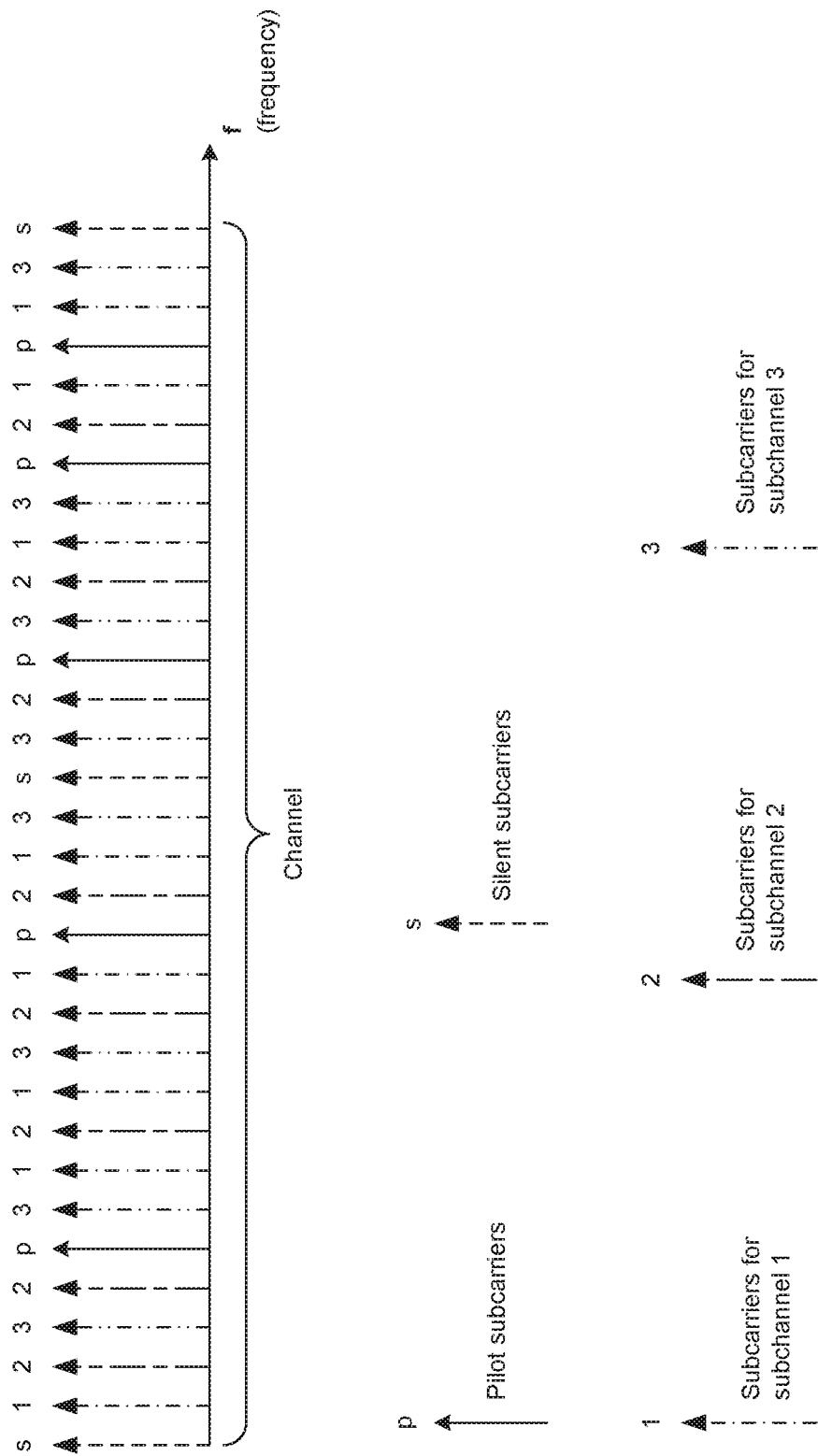
FIG. 1 illustrates a basic structure of a multi-carrier signal in the frequency domain, made up of subcarriers.

The data subcarriers can be arranged into groups called subchannels to support scalability and multiple-access. The carriers forming one subchannel are not necessarily adjacent to each other. Each subscriber may use part or all of the subchannels. The concept is illustrated in FIG. 1, which illustrates a basic structure of a multi-carrier signal in the frequency domain, made up of subcarriers. Data subcarriers can be grouped into subchannels in a particular manner. The pilot subcarriers are also distributed over the entire channel in a specific manner.

Figure 2:
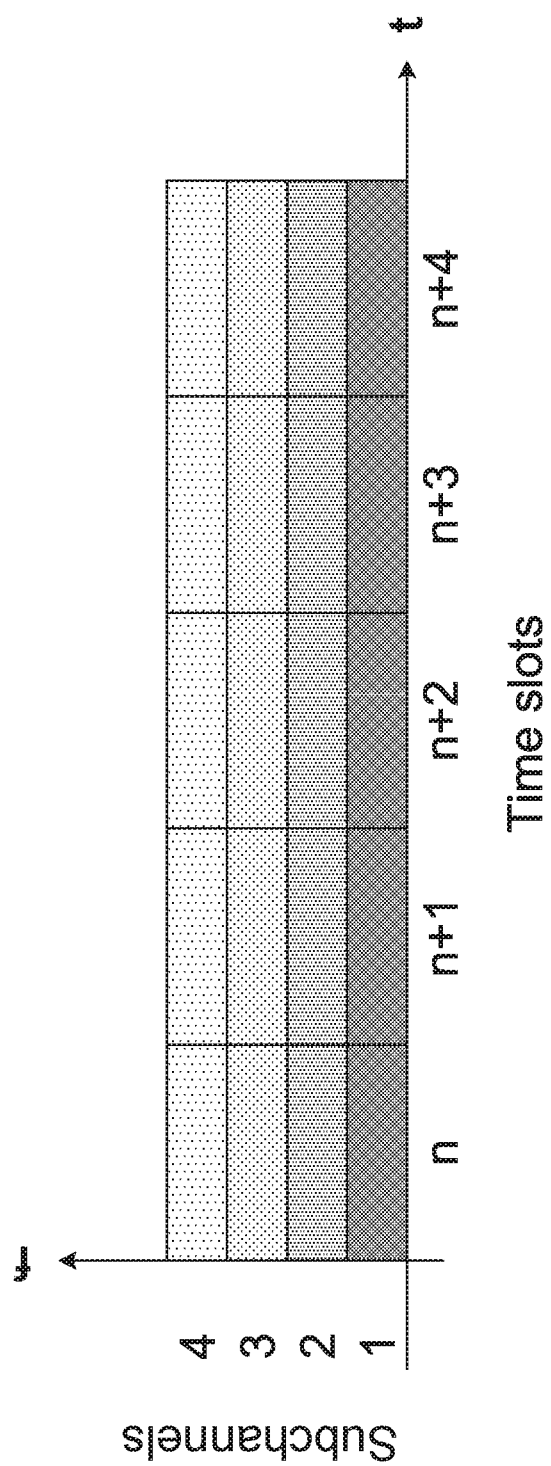
FIG. 2 illustrates a radio resource divided into small units in both the frequency and time domains: subchannels and time slots.

The basic structure of a multi-carrier signal in the time domain is made up of time slots to support multiple-access. The resource division in both the frequency and time domains is depicted in FIG. 2, which illustrates a radio resource divided into small units in both the frequency and time domains: subchannels and time slots.

Adaptive modulation and coding (AMC) adjusts the modulation and coding scheme in response to various channel conditions. It can be controlled for one individual subchannel or a group of subchannels. Table 1 provides an example of the coding and modulation schemes in AMC and corresponding spectral efficiency in bits/s/Hz.

TABLE 1

Examples of coding and modulation schemes in adaptive modulation and coding control.

| Modulation Scheme | Code Rate | Bits/s/Hz |
| --- | --- | --- |
| QPSK | 1/8 | 1/4 |
| QPSK | 1/4 | 1/2 |

TABLE 1-continued

Examples of coding and modulation schemes in adaptive modulation and coding control.

| Modulation Scheme | Code Rate | Bits/s/Hz |
| --- | --- | --- |
| QPSK | 1/2 | 1 |
| 16QAM | 1/2 | 2 |
| 16QAM | 3/4 | 3 |
| 64QAM | 2/3 | 4 |
| 64QAM | 5/6 | 5 |

Figure 3:
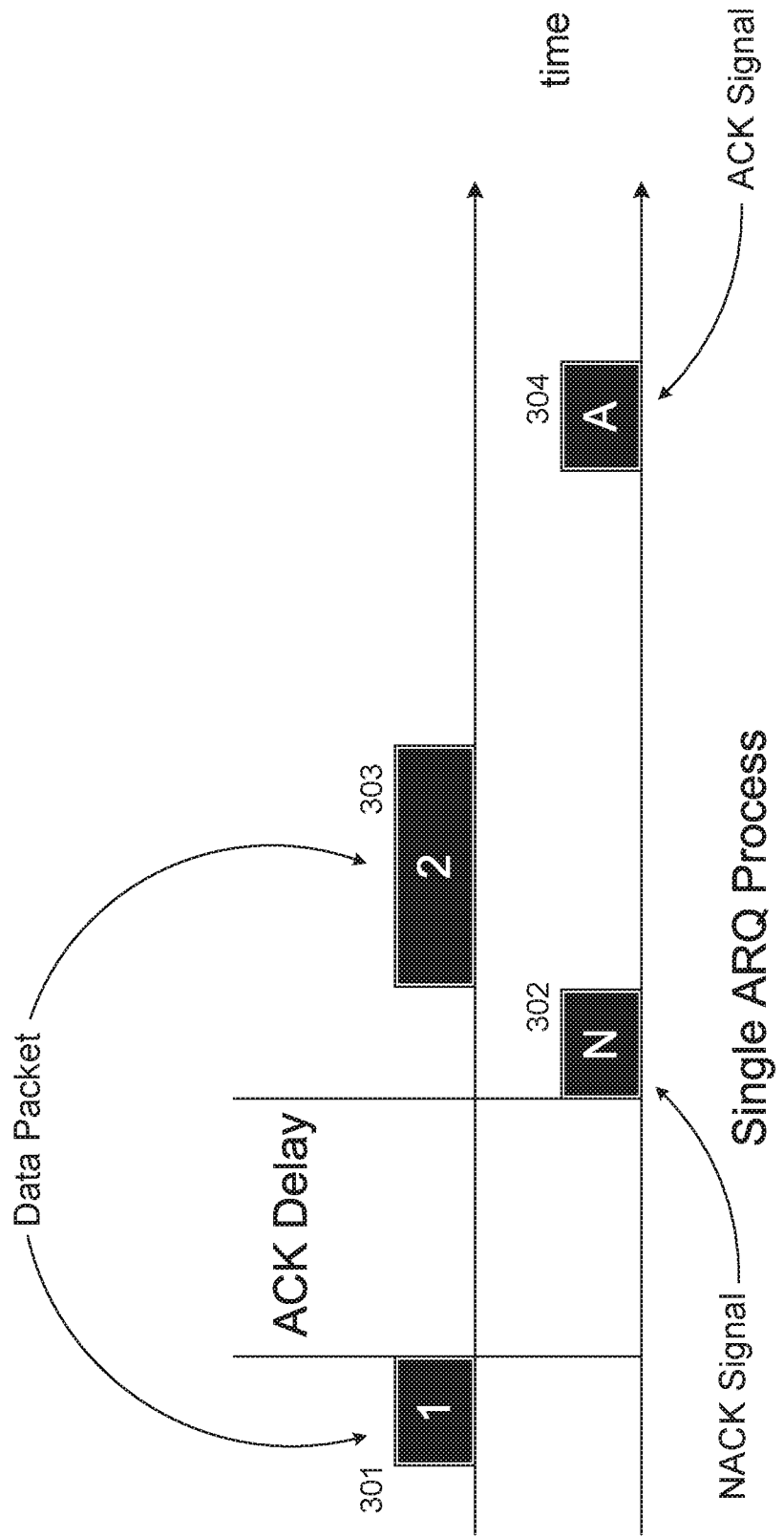
FIG. 3 illustrates a single ARQ process where a first transmission of a packet has failed with an NACK feedback, and a second transmission of the packet (may or may not be of the same size) has succeeded with an ACK feedback.

FIG. 3 illustrates a single ARQ process where the first transmission of packet 301 has failed with the NACK feedback 302, and the second transmission of packet 303 (may or may not be of the same size) has succeeded with the ACK feedback 304.

The ARQ Scheme

In a multi-carrier system, multiple subchannels can be used to transmit packets. Here, the hybrid ARQ scheme is used for at least one of the subchannels. Without loss of generality, one such subchannel is hereby designated as $SC_i$. For each of the packets transmitted over $SC_i$, the receiver performs a receiving process, based on the received information, which corresponds to the transmission process. Subsequently the receiver performs error detection on the received packet, and based on the detection result, sends an acknowledgement (ACK or NACK) signal, via a return channel, to inform the transmitter whether the reception of this particular packet was successful (ACK) or not (NACK).

In one embodiment, a channel quality indicator (CQI), indicating channel conditions, is transmitted along with the ACK/NACK signal to assist the selection of a subchannel to be used for the retransmission of the failed packet or the transmission of the next packet. The CQI is a function of, e.g., the signal-to-noise ratio (SNR), signal-to-interference-plus-noise ratio (SINR), bit error rate, symbol error rate, packet error rate, frame error rate, pilot signal power level, signal mean square error, or any combination thereof, which are measured based on the previous packet(s). In another embodiment the channel quality information transmitted along with the ACK/NACK signal comprises channel measurements.

After the transmitter receives a NACK signal, it selects a different subchannel, e.g. $SC_j$, to retransmit the failed packet since $SC_j$ may have a different channel response and a different interference level than $SC_i$, thereby creating frequency and time diversity effects that can be taken advantage of at the receiver to improve the performance. At the receiver, for the demodulation and decoding of the packet, the previously received signals that have been stored at the physical layer and the newly received retransmission signals may be combined.

In one embodiment, Chase combining is used where the soft samples of the same packet from previous transmission(s) and the current retransmission are combined coherently to provide additional diversity gain. In another embodiment, incremental redundancy is used where progressive parity packets are sent in each subsequent transmission of the packet. The retransmission process and the receiving process can continue until the packet is successfully received or a pre-specified number of retransmissions is reached.

The transmitter can reconfigure a subchannel for retransmission. This reconfiguration can be carried out in any combination of time, frequency, space, signal power, modulation, coding, or other signal domains. For example, in case of orthogonal frequency division multiple-access (OFDMA) signals, the transmitter can change the subcarrier composition of a subchannel. The newly composed subchannel may contain different subcarriers, as well as different training pilots, in terms of number, location, or other attributes.

In one embodiment, the transmitter randomly selects $SC_j$ from the subchannels available to the transmitter for the retransmission. In another embodiment, the transmitter, based on the information conveyed by CQI of all or some of the subchannels, selects a subchannel for retransmission in such a way that the system efficiency is optimized. For example, the subchannel with the best quality is assigned for retransmission of the packet that has failed multiple times.

Figure 4:
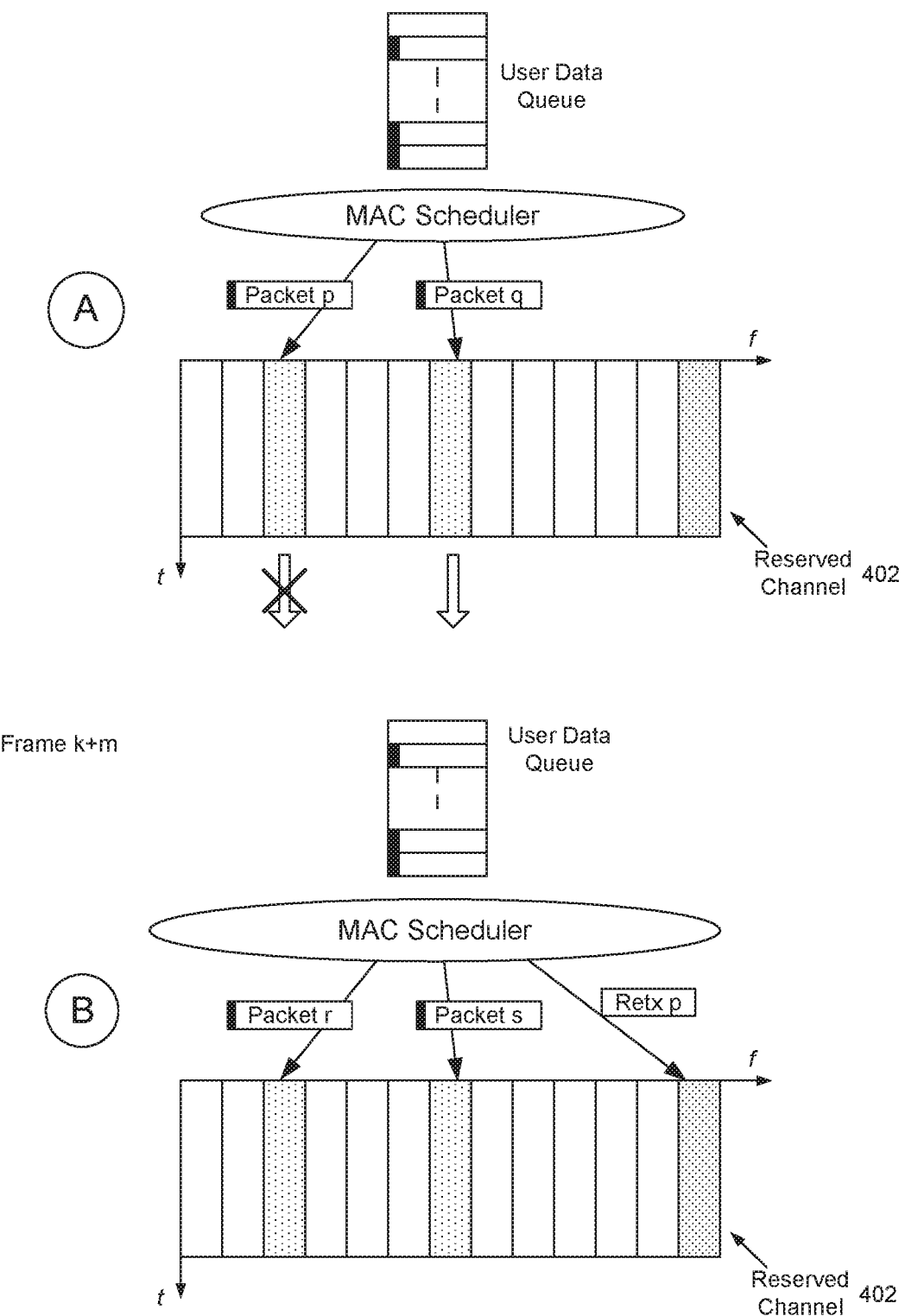
FIG. 4 depicts a system reserving at least one subchannel for retransmission of packets.

In yet another embodiment, the system reserves at least one subchannel for the retransmission of the packets. This process is illustrated in FIG. 4. In FIG. 4A, packets p and q from the same subscriber are transmitted, in Frame k, where packet p fails to be accurately received by the receiver and packet q succeeds. As depicted in FIG. 4B, packet p is retransmitted on a reserved channel 402 in Frame k+m. In FIG. 4 only one reserved subchannel is illustrated, while multiple reserved subchannels may be allocated in different embodiments.

Different embodiments take different measures to improve the channel quality of the reserved subchannels 402. In particular, in a multi-cell environment, a higher frequency reuse factor is used for reserved subchannels 402 to reduce the impact of the inter-cell interference. For instance, when regular subchannels have a reuse factor of 1, the reserved subchannels 402 may have a reuse factor of 3. The transmitter may select $SC_j$ randomly from the reserved subchannels 402, or select $SC_j$ with sufficiently high quality if the transmitter knows from the CQI information a quality of all or some of the reserved subchannels 402.

In one embodiment, the transmitter uses a modulation/coding/power scheme that matches the channel quality of that subchannel(s), in which case the retransmitted packet is fitted into the subchannel(s) by rate matching such as by repetition or puncturing.

Figure 5:
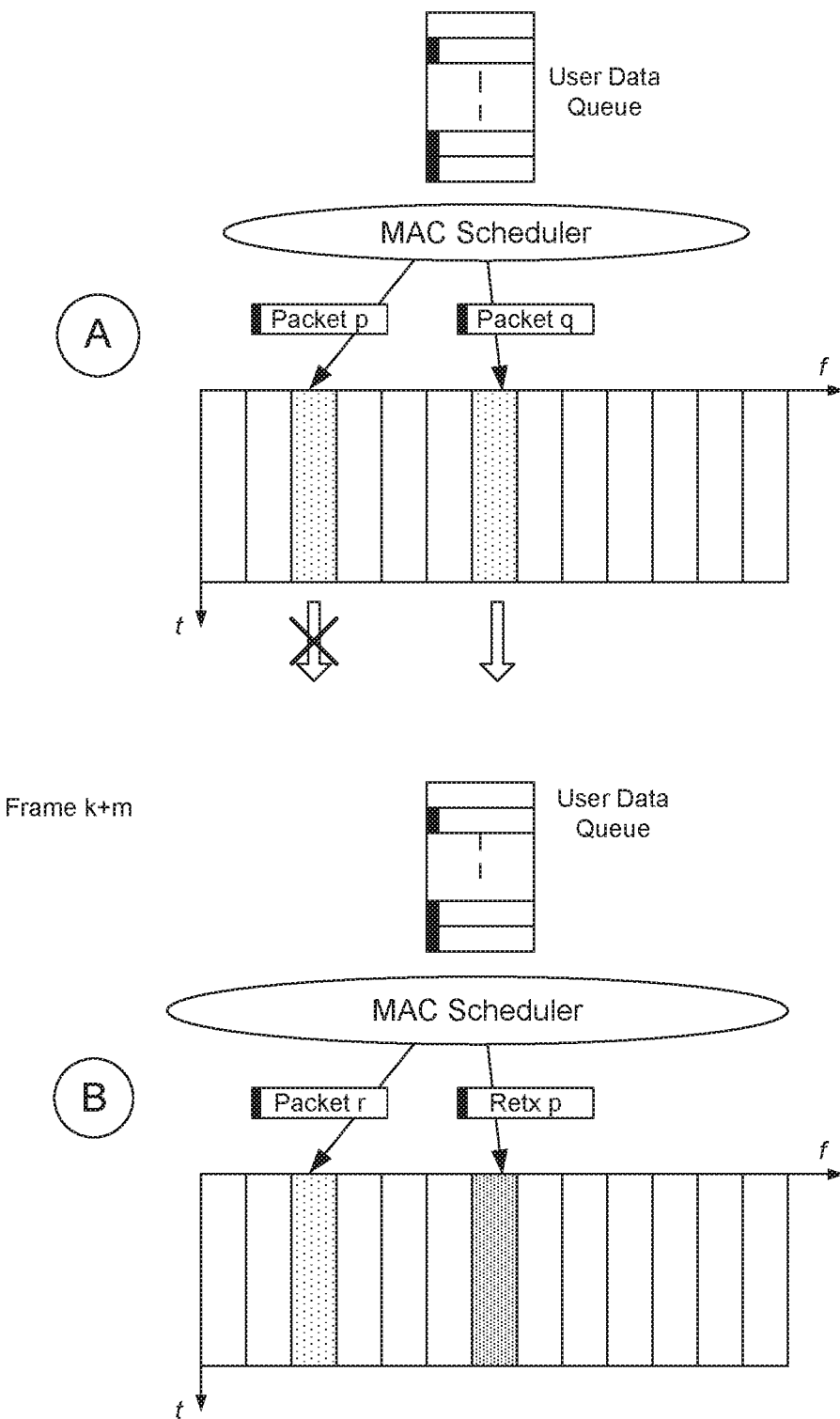
FIG. 5 depicts a case in which Packet p and q from same subscriber are transmitted in Frame k. Packet p fails and Packet q succeeds. Packet p is retransmitted on a subchannel that was originally scheduled for Packet q in Frame k+m.

In one embodiment, at least two subchannels are allocated for the transmitter by the system. Upon receiving a NACK signal indicating the need for retransmitting a packet, the transmitter swaps the transmission of the two subchannels $SC_i$ and $SC_j$ and sends the retransmission over $SC_j$ and sends the packet originally scheduled for $SC_j$ over $SC_i$. This process is illustrated in FIG. 5. In FIG. 5A, packets p and q from the same subscriber are transmitted, in Frame k, wherein packet p fails and packet q succeeds. In this situation, as depicted in FIG. 5B, packet p is retransmitted in Frame k+m via the subchannel over which packet q was sent. No reserved channel is provided in this embodiment.

In one embodiment, the retransmission over $SC_j$ uses the same settings, such as modulation, coding, and power, as the previous transmission over $SC_j$. When the packet size is different between the current transmission and previous transmission on $SC_j$, rate matching is used to fit the current retransmitted packet onto $SC_j$.

Figure 6:
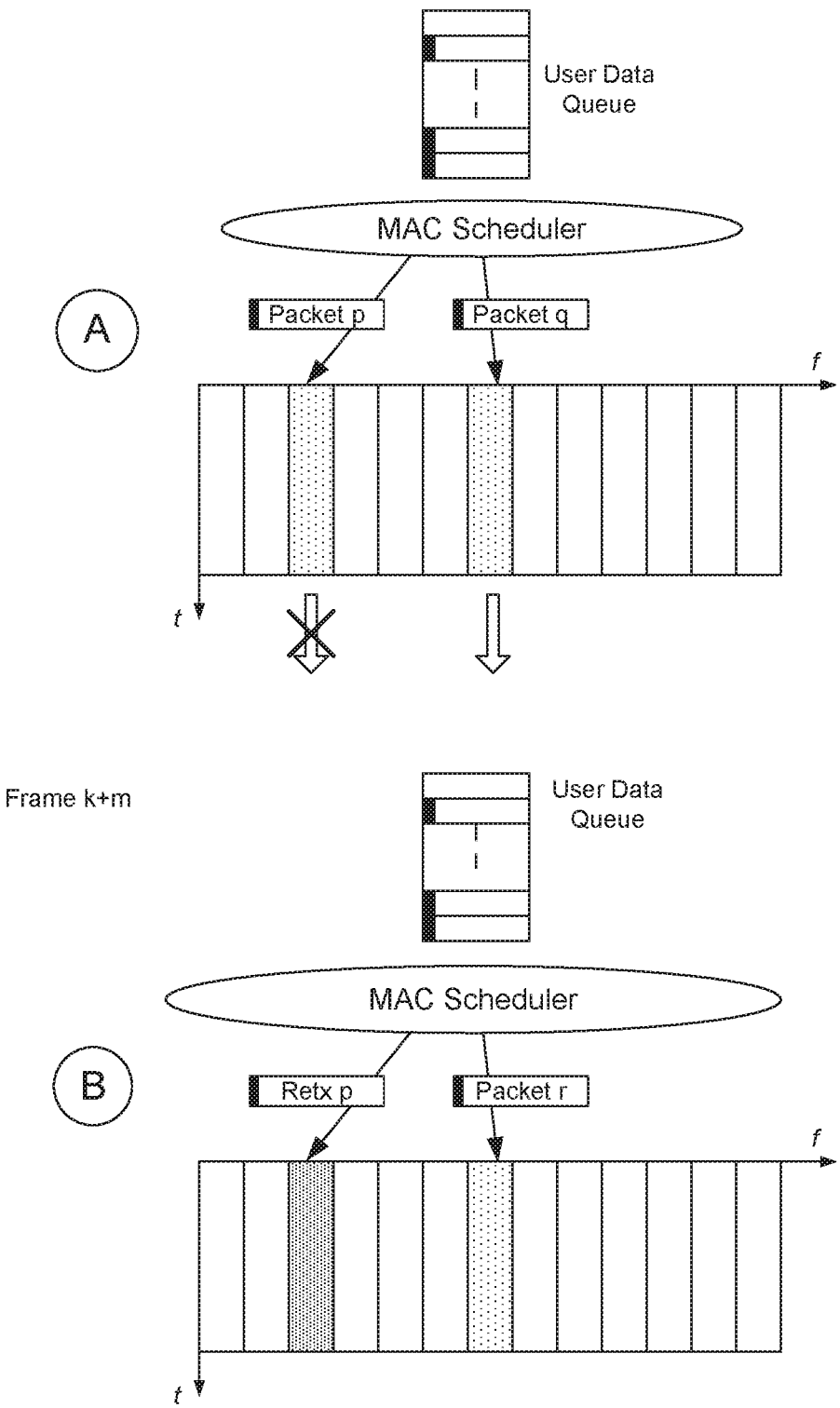
FIG. 6 depicts a case in which Packet p and q from same subscriber are transmitted in Frame k. Packet p fails and is retransmitted on same subchannel in Frame k+m.

In some cases it may be desirable for the transmitter to stay on the original subchannel for the retransmission. This process is illustrated in FIG. 6. In FIG. 6A packet p and q from the same subscriber are transmitted in Frame k, wherein packet p fails. As depicted in FIG. 6B packet p is retransmitted on the same subchannel in Frame k+m. If there are no other subchannels available to the transmitter at the time of retransmission, the transmitter selects $SC_j=SC_i$. If the transmitter has the knowledge about the quality of all or some of the subchannels and finds that the quality of $SC_i$ is good or better than the rest of the available subchannels, it again selects $SC_j=SC_i$.

In yet another embodiment, the channel quality of $SC_i$ is good and the modulation/coding index is high (16QAM or 64QAM), so the transmitter selects $SC_j=SC_i$. It should be noted, however, that the transmitter may lower down the modulation/coding scheme in the case of retransmission based on the channel quality report about the previously transmitted packets on the same subchannel.

In one embodiment, multiple subscribers may share one subchannel, for example, through time division multiplexing. Then multiple ARQ processes, each corresponding to a subscriber, can be carried out in parallel. The above described methods of retransmission are applicable to this embodiment.

In some embodiments, higher layer messaging dictates which retransmission process to be used. In other embodiments, information about a retransmission process is embedded in headers of retransmitted packets.

In one embodiment, a hierarchical ARQ process is implemented for a packet stream. The process includes an outer loop and at least one inner loop. The outer loop operates at a higher layer, for example, at the radio link protocol (RLP) layer, with a traditional ARQ approach such as sliding window selective-retransmission ARQ. The inner loops operate at lower layers, for example, the physical layer, with one of the hybrid ARQ methods described in the above embodiments.

The parameters for both the outer and the inner loop can be changed depending on the application or the unit processing capabilities. For example, the number of retransmissions within the inner loops is set smaller for delay-sensitive applications than for other delay-insensitive applications using TCP (Transmission Control Protocol). In one embodiment, the outer loop is removed for a UDP (User Datagram Protocol) packet stream such as VoIP (Voice over Internet Protocol) packets.

In one embodiment, the receiver combines the originally transmitted signal and the retransmitted signal, which are transmitted over the same or different subchannel, to detect the data packet.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A method for a transceiver in a wireless communication system, the method comprising:
   transmitting a data packet over a first subchannel to a receiver;
   receiving a signal from the receiver; and
   if the signal from the receiver indicates an error in the transmission of the data packet over the first subchannel, transmitting a redundancy version of the data packet to the receiver over a second subchannel and transmitting another data packet previously scheduled for the second subchannel over the first subchannel, wherein the second subchannel has a better channel quality for the receiver than the first subchannel.

2. The method of claim 1, further comprising receiving a channel quality indicator (CQI) from the receiver.

3. The method of claim 2, wherein the CQI is received with the signal from the receiver at substantially the same time.

4. The method of claim 1, wherein the transmission over the first or second subchannel uses an adaptive modulation and coding scheme.

5. The method of claim 1, wherein the transmission over the second subchannel uses a same modulation scheme as the transmission over the first subchannel.

6. The method of claim 1, wherein the redundancy version of the data packet is a progressive parity packet of the data packet.

7. A wireless communication system comprising a transceiver configured to:
   transmit a data packet over a first subchannel to a receiver;
   receive a signal from the receiver; and
   if the signal from the receiver indicates an error in the transmission of the data packet over the first subchannel, transmit a redundancy version of the data packet to the receiver over a second subchannel and transmit another data packet previously scheduled for the second subchannel over the first subchannel, wherein the second subchannel is has a higher better channel quality for the receiver than a channel quality of the first subchannel.

8. The system of claim 7, wherein the transceiver is further configured to receive a channel quality indicator (CQI) from the receiver.

9. A method for a transceiver in a wireless communication system, the method comprising:
   receiving a data packet over a first subchannel from a transmitter;
   transmitting a signal to the transmitter; and
   if the signal to the transmitter indicates an error in the transmission of the data packet over the first subchannel, receiving a redundancy version of the data packet from the transmitter over a second subchannel and receiving another data packet previously scheduled for the second subchannel over the first subchannel, wherein the second subchannel has a better channel quality for the transceiver than the first subchannel.

10. The method of claim 9, further comprising transmitting a channel quality indicator (CQI) to the transmitter.

11. The method of claim 10, wherein the CQI is transmitted with the signal to the transmitter at substantially the same time.

12. The method of claim 9, wherein the reception over the first or second subchannel uses an adaptive modulation and coding scheme.

13. The method of claim 9, wherein the reception over the second subchannel is based on a same modulation scheme as the reception over the first subchannel.

14. The method of claim 9, wherein the redundancy version of the data packet is a progressive parity packet of the data packet.

15. A wireless communication system, the wireless communication system comprising a transceiver configured to:
   receive a data packet over a first subchannel from a transmitter;
   transmit a signal to the transmitter; and
   if the signal to the transmitter indicates an error in the transmission of the data packet over the first subchannel, receive a redundancy version of the data packet from the transmitter over a second subchannel and receive another data packet previously scheduled for the second subchannel over the first subchannel, the second subchannel containing a second group of subcarriers, wherein the second subchannel has a better channel quality for the transceiver than the first subchannel.

16. The system of claim 15, wherein the transceiver is further configured to transmit a channel quality indicator (CQI) to the transmitter.

17. The system of claim 16, wherein the CQI is transmitted with the signal to the transmitter at substantially the same time.

18. The system of claim 15, wherein the reception over the first or second subchannel uses an adaptive modulation and coding scheme.

19. The system of claim 15, wherein the redundancy version of the data packet is a progressive parity packet of the data packet.

* * * * *